United States Patent
Barker et al.

(10) Patent No.: US 11,348,747 B2
(45) Date of Patent: May 31, 2022

(54) SWITCH ASSEMBLY WITH ENERGY HARVESTING

(71) Applicant: S&C Electric Company, Chicago, IL (US)

(72) Inventors: Jim Barker, West Bend, WI (US); Michael Maroney, Chicago, IL (US); Keith Benson, Chicago, IL (US); Nicholas Seng, Chicago, IL (US); Jason R. Bogusz, Chicago, IL (US); Bethany McDearmon, Chicago, IL (US); Alireza Tajfar, Northbrook, IL (US); Alejandro Montenegro, Chicago, IL (US)

(73) Assignee: S&C Electric Company, Chicago, IL (US)

( * ) Notice: Subject to any disclaimer, the term of this patent is extended or adjusted under 35 U.S.C. 154(b) by 0 days.

(21) Appl. No.: 17/108,784

(22) Filed: Dec. 1, 2020

(65) Prior Publication Data
US 2021/0175032 A1    Jun. 10, 2021

Related U.S. Application Data

(60) Provisional application No. 62/944,301, filed on Dec. 5, 2019.

(51) Int. Cl.
*H01H 33/38*    (2006.01)
*H01H 33/666*    (2006.01)

(52) U.S. Cl.
CPC .......... *H01H 33/666* (2013.01); *H01H 33/38* (2013.01)

(58) Field of Classification Search
CPC ........... H01H 33/666; H01H 33/66207; H01H 33/38; H01H 2033/6665; H01H 9/0005;
(Continued)

(56) References Cited

U.S. PATENT DOCUMENTS

| 5,452,172 A * | 9/1995 | Lane ............. H01F 7/1615 361/71 |
| 7,495,574 B2 * | 2/2009 | Rocamora ............ G08C 17/02 340/638 |

(Continued)

FOREIGN PATENT DOCUMENTS

| EP | WO2014124771 A1 * | 8/2014 | ............. H01H 9/00 |
| WO | 2014/124771 A1 | 8/2014 | |
| WO | 2019/083899 A1 | 5/2019 | |

OTHER PUBLICATIONS

International Search Report and Written Opinion for International Application No. PCT/US2020/062727 dated Feb. 26, 2021. (11 pages).

*Primary Examiner* — William A Bolton

(57) ABSTRACT

A switch assembly including a switch and a high impedance element used for energy harvesting purposes that are connected to a power line at one end and assembly electronics at an opposite end, where in one non-limiting embodiment the switch assembly has particular application for use in connection with a vacuum interrupter. The high impedance element has higher impedance than the switch so that current flows through the switch from the power line when the switch is closed and through the high impedance element from the power line when the switch is open, where power from the high impedance element can power a switch closing device, such as a solenoid actuator. The high impedance element can be a resistive element, a capacitive element or a combination of a resistive and capacitive element.

19 Claims, 2 Drawing Sheets

(58) Field of Classification Search
CPC ........ H01H 9/0038; H01H 9/54; H01H 9/542; H01H 9/547; H01H 2009/546
USPC .................... 218/118, 102, 143, 144, 145
See application file for complete search history.

(56) References Cited

U.S. PATENT DOCUMENTS

| | | | |
|---|---|---|---|
| 7,786,710 B2* | 8/2010 | Drugge | H02J 3/1814 |
| | | | 323/210 |
| 8,334,738 B2* | 12/2012 | Smith | H01H 75/04 |
| | | | 335/18 |
| 8,658,932 B2* | 2/2014 | Schellekens | H01H 9/54 |
| | | | 218/122 |
| 9,870,885 B2* | 1/2018 | Kovacich | H01H 33/66207 |
| 2008/0143305 A1 | 6/2008 | Drugge et al. | |
| 2009/0212898 A1* | 8/2009 | Montante | H01H 31/02 |
| | | | 337/171 |
| 2015/0116878 A1* | 4/2015 | Richard | H01H 50/54 |
| | | | 361/71 |
| 2015/0170857 A1 | 6/2015 | Rueber | |

\* cited by examiner

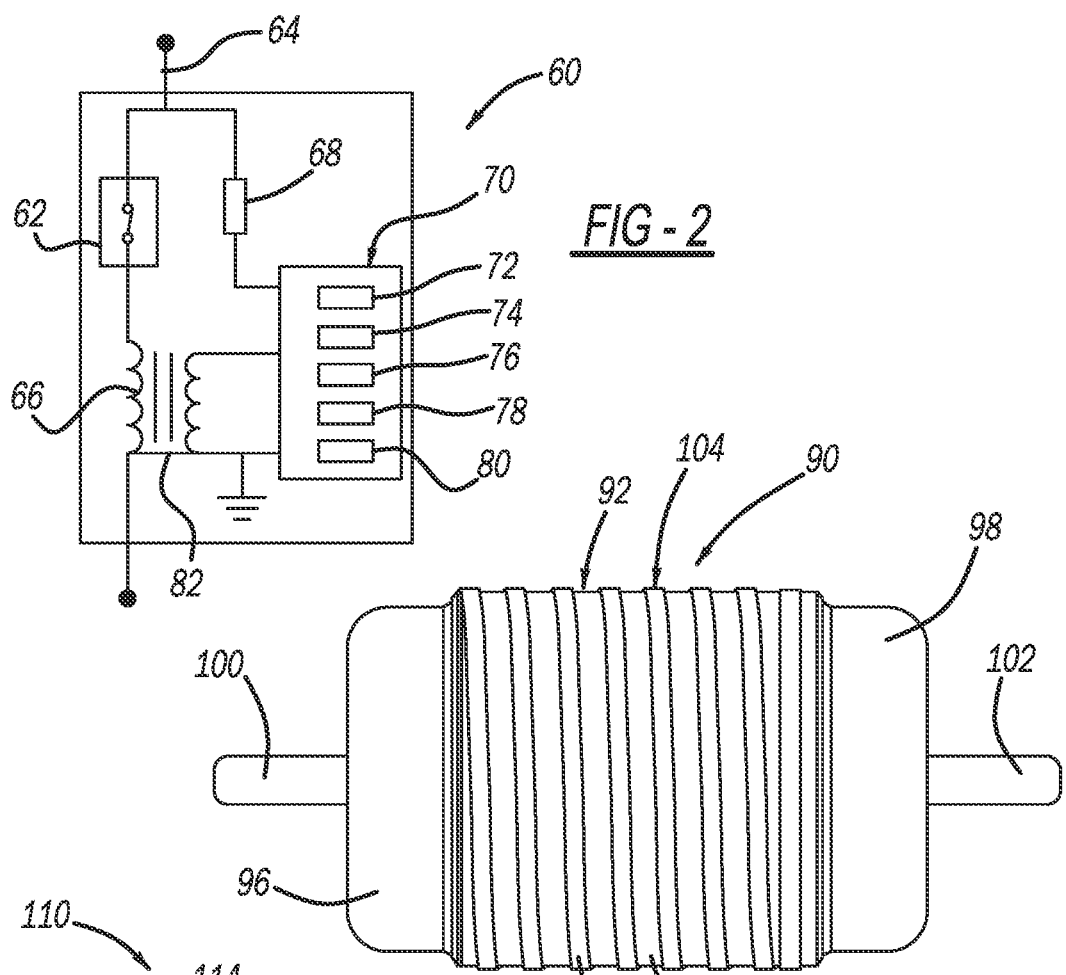
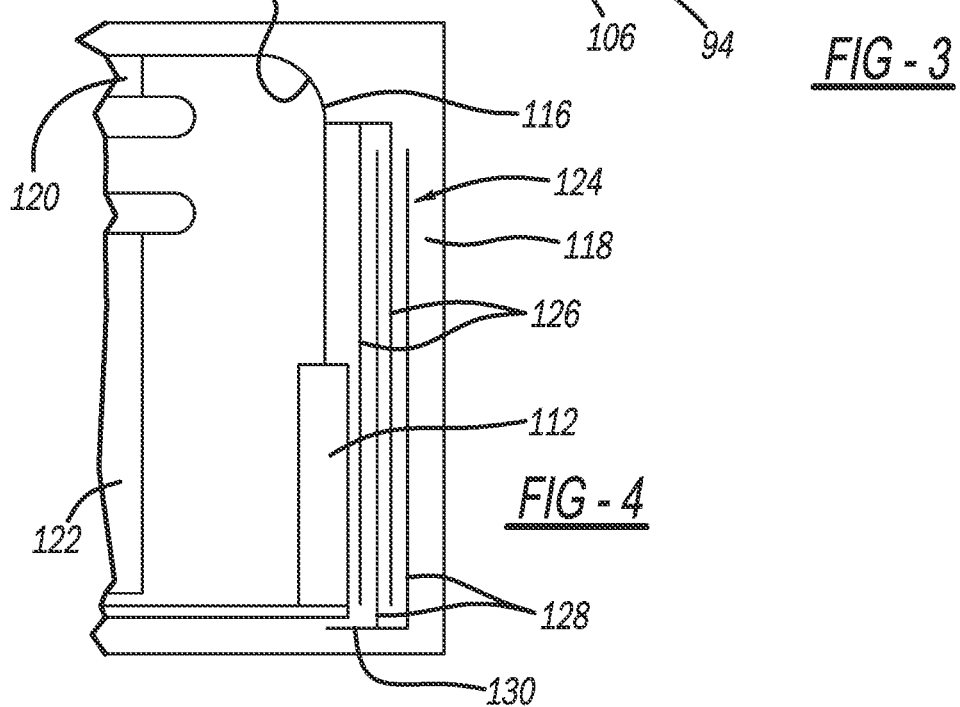

SWITCH ASSEMBLY WITH ENERGY HARVESTING

CROSS-REFERENCE TO RELATED APPLICATION

This application claims the benefit of priority from the U.S. Provisional Application No. 62/944,301, filed on Dec. 5, 2019, the disclosure of which is hereby expressly incorporated herein by reference for all purposes.

BACKGROUND

Field

This disclosure relates generally to a switch assembly including a high impedance element that is used for energy harvesting.

Discussion of the Related Art

An electrical power distribution network, often referred to as an electrical grid, typically includes a number of power generation plants each having a number of power generators, such as gas turbines, nuclear reactors, coal-fired generators, hydro-electric dams, etc. The power plants provide power at a variety of medium voltages that are then stepped up by transformers to a high voltage AC signal to be connected to high voltage transmission lines that deliver electrical power to a number of substations typically located within a community, where the voltage is stepped down to a medium voltage for distribution. The substations provide the medium voltage power to a number of three-phase feeders including three single-phase feeder lines that carry the same current, but are 120° apart in phase. A number of three-phase and single phase lateral lines are tapped off of the feeder that provide the medium voltage to various distribution transformers, where the voltage is stepped down to a low voltage and is provided to a number of loads, such as homes, businesses, etc.

Power distribution networks of the type referred to above typically include a number of switching devices, breakers, reclosers, interrupters, etc. that control the flow of power throughout the network. A vacuum interrupter is a switch that has particular application for these types of devices. A vacuum interrupter employs opposing contacts, one fixed and one movable, positioned within a vacuum enclosure. When the interrupter is opened by moving the movable contact away from the fixed contact the arc that is created between the contacts is quickly extinguished by the vacuum. A vapor shield is typically provided around the contacts to contain the arcing. For certain applications, the vacuum interrupter is encapsulated in a solid insulation housing that has a grounded external surface.

These types of vacuum interrupters are sometimes employed in single phase self-powered magnetically actuated reclosers, such as fault recloser switches. These types of magnetically actuated reclosers typically employ spring mechanisms or solenoid actuators that open and close the interrupter contacts. For one type of solenoid actuator, an armature is provided that is moved by an opening coil to open the vacuum interrupter and a closing coil to close the vacuum interrupter, where the armature and a stator provide a magnetic path for the flux produced by the coils. The coils are de-energized after the actuator is moved to the open or closed position, and permanent magnets are used to hold the armature against a latching surface in the open or closed position.

Various devices and techniques are known in the art for energy harvesting that provide the self-power in these types of devices. These techniques can generally be separated into two categories, namely, series configuration devices or current transformers that are in electrical series with the power line and are floating with respect to ground and shunt configuration devices or power transformers that are connected to the power line and ground. However, both of these types of devices have significant size and weight in order to provide the necessary power to actuate the vacuum interrupter contacts. For example, current transformers are typically large and bulky because the core needs to be large enough to provide enough power to operate the solenoid to open the switch at low current levels. Power transformers are typically large and bulky because of the requirement that they be electrically insulated. It is desirable to reduce the size and weight of these types of switches for a number of reasons, such as reducing cost and increasing installation complexity by being able to install and remove the switches from the pole on which they are mounted using a hot stick.

SUMMARY

The following discussion discloses and describes a switch assembly including a switch and a high impedance element used for energy harvesting purposes that are connected to a power line at one end and assembly electronics at an opposite end, where in one non-limiting embodiment the switch assembly has particular application for use in connection with a vacuum interrupter. The high impedance element has higher impedance than the switch so that current flows through the switch from the power line when the switch is closed and through the high impedance element from the power line when the switch is open, where power from the high impedance element can power a switch closing device, such as a solenoid actuator. The high impedance element can be a resistive element, a capacitive element or a combination of a resistive and capacitive element.

Additional features of the disclosure will become apparent from the following description and appended claims, taken in conjunction with the accompanying drawings.

BRIEF DESCRIPTION OF THE DRAWINGS

FIG. 2 is a schematic diagram of a switch circuit including a high impedance element electrically coupled to a power line and electronics;

FIG. 3 is an isometric view of an internal portion of a vacuum interrupter assembly that can be used in the switch assembly shown in FIG. 1 illustrating a resistive element wrapped around a vacuum bottle; and FIG. 4 is a partial cut-away type view of an internal portion of a vacuum interrupter assembly that can be used in the switch assembly shown in FIG. 1 illustrating a capacitive element.

DETAILED DESCRIPTION OF THE EMBODIMENTS

Figure 1:
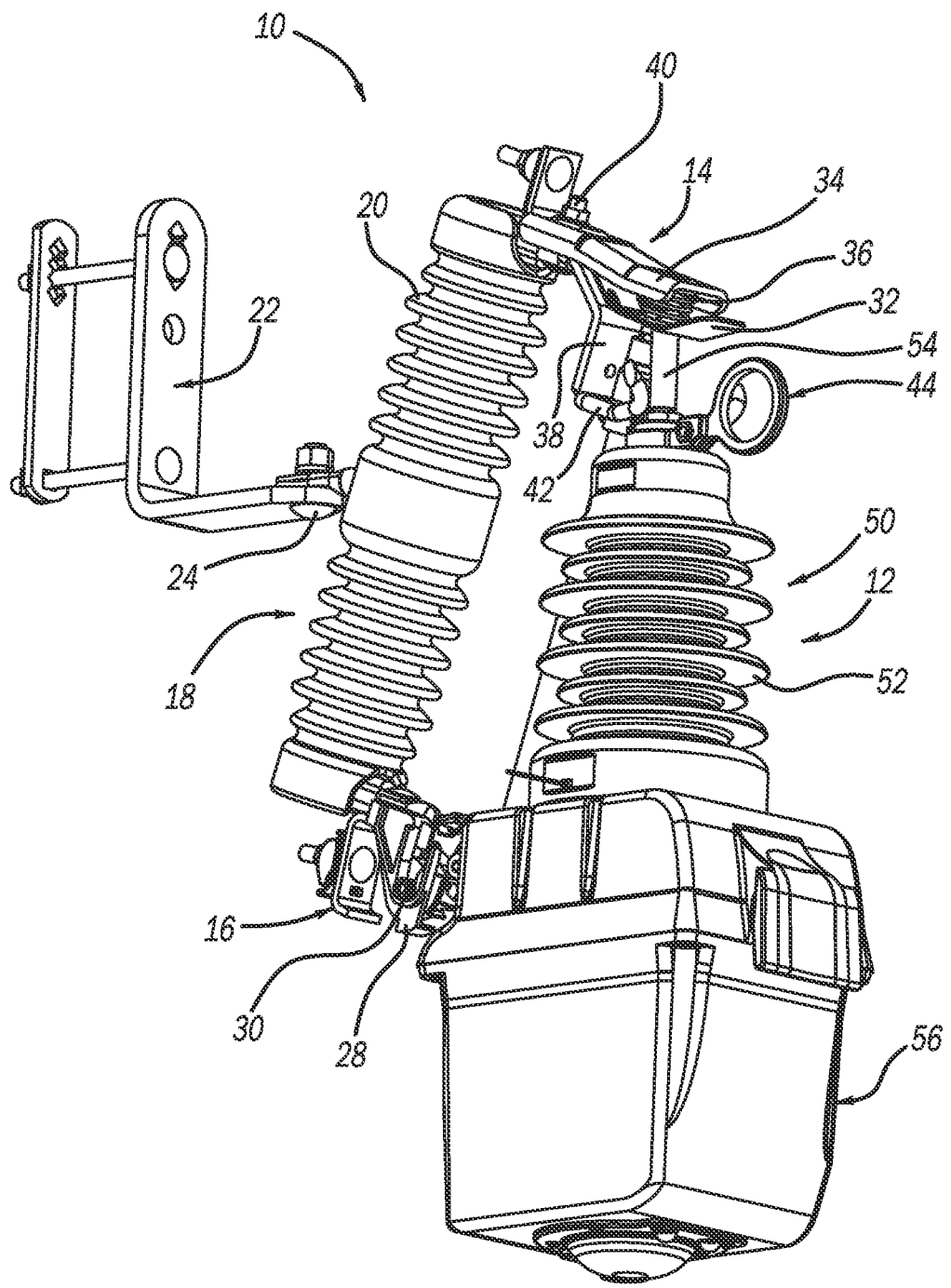
FIG. 1 is an isometric view of a switch assembly connected to a pole mounted insulator and including a vacuum interrupter.

The following discussion of the embodiments of the disclosure directed to a switch assembly including a switch and a high impedance element used for energy harvesting purposes that are connected to a power line at one end and assembly electronics at an opposite end is merely exemplary in nature, and is in no way intended to limit the disclosure or its applications or uses. For example, the discussion herein refers to the switch assembly as being part of a fault recloser switch having a vacuum interrupter. However, as will be appreciated by those skilled in the art, the switch assembly will have other applications.

FIG. 1 is an isometric view of a pole mounted switch assembly 10 including a single phase self-powered magnetically actuated recloser 12 coupled to a mounting assembly 14 at one end and a mounting hinge 16 at an opposite end. The mounting assembly 14 is secured to one end of an insulator 18 having skirts 20 and the mounting hinge 16 is secured to an opposite end of the insulator 18, where the insulator 18 is mounted to a bracket 22 by a bolt 24 and may be attached to a utility pole (not shown). The mounting hinge 16 includes a channel catch 28 that accepts a trunnion rod 30 coupled to the recloser 12 and that is electrically coupled to a unit bottom contact (not shown). The mounting assembly 14 includes a mounting top contact 32, an extension tab 34 and a spring 36 positioned between the contact 32 and the tab 34. The mounting assembly 14 also includes a support tab 38 bolted to the extension tab 34 by a bolt 40 and a pair of mounting horns 42 coupled to and extending from the support tab 38 opposite to the extension tab 34. A guiding pull ring member 44 is coupled to a top of the recloser 12 and allows a worker to more easily install and remove the recloser 12 from the utility pole using, for example, a hot stick. Although the recloser 12 is shown and described herein as being mounted to a utility pole, it is noted that this is by way of a non-limiting example in that the recloser 12 may have application for other locations in a medium voltage power network, such as in a pad mounted or sub-surface switchgear.

The recloser 12 includes a vacuum interrupter 50 having an outer insulation housing 52 that encloses a vacuum interrupter switch (not shown) of the type referred to above, where the vacuum interrupter 50 can be any vacuum interrupter known in the art for medium voltage uses that is suitable for the purposes discussed herein. More particularly, the vacuum interrupter 50 defines a vacuum chamber that encloses a fixed contact (not shown) that is electrically coupled to a unit top contact 54 and a movable contact (not shown) that is electrically coupled to the unit bottom contact, where the fixed and movable contacts are in contact with each other within the vacuum chamber when the vacuum interrupter 50 is closed. When the vacuum interrupter 50 is opened by moving the movable contact away from the fixed contact the arc that is created between the contacts is quickly extinguished by the vacuum. The recloser 12 also includes an enclosure 56 that encloses a solenoid actuator or other device that opens and closes the vacuum interrupter 50, various electronics, energy harvesting devices, sensors, communications devices, etc. consistent with the discussion herein.

As discussed above, switches of the type of the recloser 12 include energy harvesting devices that harvest energy from the power line that can then be used to power the solenoid actuator within the enclosure 56 to close the recloser 12 and power the various electronics associated with the recloser 12, where those energy harvesting devices are generally large and heavy. The present invention proposes employing a high impedance element, such as a resistor and/or a capacitor, that is connected to the power line at one end and vacuum interrupter electronics at an opposite end, which have a reference potential equal to the movable electrode in the vacuum interrupter 50. Current flows through the lower impedance vacuum interrupter 50 when it is closed and not through the element, but flows through the element when the vacuum interrupter 50 is open. This high impedance path functions as a current source from which the electronics can harvest energy.

FIG. 2 is schematic diagram of a switch circuit 60 including a switch 62 representing the switch in the vacuum interrupter 50 that is electrically coupled to line 64 representing the power line, a current transformer 66 that provides power to an electronics box 70 when the switch 62 is closed and a high impedance element 68, such as a resistive element a capacitive element or a combination of a resistive and capacitive element, that provides power to the electronics box 70 when the switch 62 is open. The electronics box 70 includes, among other things, a solenoid actuator 72, or other suitable switch closing device, voltage and current sensors 74, a processor 76, a communications device 78 and a power storage device 80, such as a bank of capacitors. When the switch 62 is closed, the high impedance of the element 68 prevents current flow through it and current flows through the switch 62 to the current transformer 66 to provide power to the electronics box 70, where the current transformer 66 is small because it only powers electronics and a small amount of power to trip the switch 62 open. When the switch 62 is open, current from the line 64 flows through the element 68 and provides power to operate the electronics in the box 70 and operate the solenoid actuator 72 to close the switch 62 on line 82.

FIG. 3 is a side view of a vacuum interrupter 90 that can replace the vacuum interrupter 50 illustrating a non-limiting example embodiment where the high impedance element 68 is a resistor. The vacuum interrupter 90 includes an outer housing 92 operating as a vacuum bottle including an insulating center portion 94, such as a ceramic tube, a conductive end cap 96 at one end of the center portion 94 and a conductive end cap 98 at an opposite end of the center portion 94. A fixed electrode 100 is electrically coupled to and extends through the end cap 96 and into the housing 92 and a movable electrode 102 extends into the housing 92 through the end cap 98. A spiral resistive element 104 including windings 106 is wrapped around the center portion 94 and has one end electrically coupled to the end cap 96 so that it is electrically coupled to the power line through the electrode 100 and another end electrically separated from the end cap 98, and including a tab (not shown) to be electrically coupled to the electronics box 70. Although the element 104 is spiral shaped in this example, it can have other shapes in other embodiments. The resistive element 104 is specifically engineered to have the desired impedance for the particular application in the electrical network and the power levels anticipated. For example, the element 104 can be made of any suitable material, such as a conductive ink, the number of the windings 106 can be properly selected for a desired impedance, the thickness of the windings 106 can be properly selected for the desired impedance, etc. The element 104 can also be designed to strategically grade the electric field around the vacuum interrupter 50.

FIG. 4 is a partial cross-sectional type view of a vacuum interrupter 110 of the type discussed above illustrating a non-limiting example embodiment where the high impedance element 68 is a capacitor. The vacuum interrupter 110 includes a cylindrical outer housing 112 defining a vacuum chamber 114 therein and including a conductive endcap 116, where the housing 112 is enclosed in an insulating medium 118. A fixed contact 120 is electrically coupled to the endcap 116 and extends into the chamber 114 and a movable contact 122 extends into the chamber 114 from an opposite end of the housing 112. A capacitive element 124 is formed in the medium 118 that provides the high impedance element and includes a series of space apart plates, where alternating plates 126 are electrically coupled to the endcap 116 and alternating plates 128 are electrically coupled to a tab 130 that will be coupled to the electronics box 70, where the tab 130 is kept at a voltage only 10s or 100s volts above the potential of the movable contact 122.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A switch assembly comprising:
   a switch electrically coupled at one end to a power line and at an opposite end to electronics; and
   a high impedance element coupled at one end to the power line and at an opposite end to the electronics, the high impedance element having higher impedance than the switch so that current flows through the switch from the power line when the switch is closed and through the high impedance element from the power line when the switch is open; and wherein,
   the switch assembly includes a vacuum interrupter having a vacuum chamber defined by a vacuum housing, and the high impedance element is disposed on a surface of the vacuum housing.

2. The switch assembly according to claim 1 wherein the high impedance element is a resistive element.

3. The switch assembly according to claim 1 wherein the high impedance element is a capacitive element.

4. The switch assembly according to claim 1 wherein the high impedance element is a combination of a resistive and capacitive element.

5. The switch assembly according to claim 1 wherein the high impedance element is a spiral resistive element wrapped around the surface.

6. The switch assembly according to claim 1 wherein the resistive element is a conductive ink printed on the surface.

7. The switch assembly according to claim 1 wherein the high impedance element includes a resistive element disposed on the surface and a capacitive element formed in an insulating medium portion of the vacuum housing.

8. The switch assembly according to claim 1 wherein one of the electronics is a switch closing device, the switch closing device being powered through the high impedance element to close the switch when it is open.

9. The switch assembly according to claim 8 wherein the switch closing device is a solenoid actuator.

10. The switch assembly according to claim 1 wherein the electronics include sensors, processors, communications devices and power storage devices.

11. The switch assembly according to claim 1 wherein the switch assembly is part of a self-powered magnetically actuated recloser.

12. A vacuum interrupter for controlling power flow on a power line, the vacuum interrupter comprising:
    electronics including a switch closing device;
    a switch electrically coupled at one end to the power line and at an opposite end to the electronics;
    a resistive element coupled at one end to the power line and at an opposite end to the electronics, the resistive element having higher impedance than the switch so that current flows through the switch from the power line when the switch is closed and through the resistive element from the power line when the switch is open, the switch closing device being powered through the resistive element to close the switch when it is open; and wherein
    the resistive element is a spiral resistive element wrapped around a vacuum housing.

13. The vacuum interrupter according to claim 12 wherein the resistive element is a conductive ink.

14. A switch assembly comprising:
    a switch electrically coupled at one end to a power line and at an opposite end to electronics; and
    a high impedance element coupled at one end to the power line and at an opposite end to the electronics, the high impedance element having higher impedance than the switch so that current flows through the switch from the power line when the switch is closed and through the high impedance element from the power line when the switch is open, and
    wherein the switch assembly includes a vacuum interrupter having a vacuum chamber defined by a vacuum housing, and the high impedance element is a spiral resistive element wrapped around the vacuum housing.

15. The switch assembly according to claim 14 wherein the resistive element is a conductive ink printed on a surface of the vacuum housing.

16. The switch assembly according to claim 14 wherein the high impedance element includes a capacitive element formed in an insulating medium portion of the vacuum housing.

17. The switch assembly according to claim 14 wherein one of the electronics is a switch closing device, the switch closing device being powered through the high impedance element to close the switch when it is open.

18. The switch assembly according to claim 14 wherein the switch closing device is a solenoid actuator.

19. The switch assembly according to claim 14 wherein the switch assembly is part of a self-powered magnetically actuated recloser.

* * * * *